United States Patent Office 3,487,749
Patented Jan. 6, 1970

3,487,749
COPYING MILLING MACHINE
Konrad Bschorer, Wolfratshausen-Waldram, Germany, assignor to Friedrich Deckel Prazisions Mechanik und Maschinenbau, Munich, Germany, a German firm
Filed May 6, 1968, Ser. No. 726,694
Claims priority, application Germany, May 10, 1967, D 53,052
Int. Cl. B23c 1/00, 3/00, 7/00
U.S. Cl. 90—11                     10 Claims

ABSTRACT OF THE DISCLOSURE

A copying milling machine having provision for hydraulic feed of the cutting tool during rough milling operations and manual feed of the cutting tool during fine or finishing operations, is provided with special means for moving the cutting tool step by step from one line to another, when it is desired to perform the manually controlled fine milling or finishing operation in a line-by-line manner. This special means for hydraulically moving the cutting tool from one line of operation to the next line of operation, includes a disconnectable clutch for connecting each hydraulic motor to its feed screw for feeding the tool in one coordinate direction, and a series of individually selectable cams mounted on and turning with each coordinate fed screw, the selected cam serving to operate an electric switch which terminates the feeding operation at the end of a given extent of feeding, depending upon which cam is selected, thereby enabling control of the distance from one line of operation to the next line, when this special hydraulic feed is used. A manual selector knob moves the selected one of the cams into cooperative relation to the electric switch. Another manually operable knob mounted on the holder which holds the hydraulic control valve, is effective to select the particular coordinate direction in which the step-by-step feeding movement is desired, preventing the control valve from operating to cause feeding movement in any other direction except the selected one.

BACKGROUND OF THE INVENTION

The invention relates to copying milling machines, that is, machines which can perform milling work in accordance with a template or pattern over which a tracing stylus is moved. In some machines of this general kind, there is provision for hydraulic driving of the milling cutter or tool while doing rough milling, and for manually moving the tool while doing fine milling or finishing.

An example of such a machine is the one disclosed in Reeber Patent 3,266,375, granted Aug. 16, 1966, sometimes hereafter referred to as "said patent." Another example is the machine disclosed in the copending application, Ser. No. 668,832, filed Sept. 19, 1967 in the names of the present applicant and others. The disclosure of the present application will proceed on the assumption that the reader is already familiar with machines of this general character, and especially with the machines disclosed in said patent and said application, so that known parts of such machines need not be illustrated or described in the present application.

In certain types of milling work, it is desirable to perform the milling in what may be called a line-by-line manner, moving the milling tool along a straight line across the work, then shifting the milling tool to another line parallel to and a slight distance away from the first line, and again moving the tool across the work along this second line, then shifting to a third line, and so on.

The prior machines are adapted to accomplish this line-by-line milling when the machines are set up for hydraulic movement of the tool (as for example in rough milling) but in the prior machines there is no easy, simple, and satisfactory way of accomplishing this when the machines are set up for manual feeding of the tool.

It is, accordingly, an object of the present invention to provide a machine which can be operated with either hydraulic feed or manual feed of the cutting tool, and which, when set up for manual feed of the tool in one coordinate direction, also has provision for hydraulic step by step feed in another coordinate direction, to move the cutting tool from one line of manual advance to the next line of manual advance, so that line-by-line milling can be accomplished with great ease and rapidity, and with satisfactory guidance of the manually advanced tool along the selected line.

Another object is the provision of a machine of the above mentioned character, in which the hydraulic feeding mechanism for shifting the manually advanced tool from one line of work to the next line of work, takes advantage of many hydraulic feed parts which are provided for the hydraulic feed during rough milling operations, thereby requiring a minimum of additional parts for the special hydraulic feeding means used in line-by-line manual milling.

Still another object is the provision of easily adjustable control means for preventing accidental hydraulic shifting in a wrong direction, and for easily and quickly selecting the length or size of each step of the hydraulically operated step-by-step movement from one milling line to the next milling line.

A further object is the provision of a generally improved and more satisfactory copying milling machine.

BRIEF DESCRIPTION OF THE DRAWINGS

In the accompanying drawings, which constitute a material part of the present disclosure and are incorporated herein by reference, and which relate to an illustrative embodiment of the invention.

DESCRIPTION OF THE PREFERRED EMBODIMENT

The main parts of the milling machine are conventional, and need not be illustrated or described. The exact form of the machine is immaterial for purposes of the present invention, and may be varied within the skill and knowledge of the art. Also, it is immaterial for purposes of the present invention whether the movement between the milling cutter and the workpiece is accomplished by holding the workpiece stationary while the tool moves, or by holding the tool stationary while the workpiece moves. Both kinds of movement are known. In the present application, reference to movement of the tool is to be understood as referring to relative movement between the tool and the workpiece, and as covering either a movable tool relative to a stationary workpiece, or a movable workpiece relative to a stationary tool; that is, of course, a stationary location of the tool, since in any event the milling cutter or tool is normally rotating about its own axis.

As well known in the art, machines of this general character include a hydraulic control valve for controlling the hydraulic feed (of the tool spindle or of the work table, as the case may be) when the machine is set up for hydraulic feeding operations. In said Patent 3,266,375, the hydraulic control element is indicated in general at 76. In said pending application 668,832, the hydraulic control element or valve is indicated at 58. For certain kinds of milling operations, a feeler or tracing stylus is mounted on the control valve, and it is the movements of this feeler or stylus, transmitted to the mechanism of the control valve, that cause the movements of the hydraulic feed.

According to the present invention, however, the feeler or stylus is removed from the control valve, and is replaced by a special actuating member which will actuate the control valve in a manner to cause feeding movement in only one selected direction, that is, the stepping direction necessary for causing movement of the tool relative to the workpiece across from one line of line-by-line operation to the next line of line-by-line operation, preventing accidental hydraulic feeding movement in any other direction.

Figure 1:
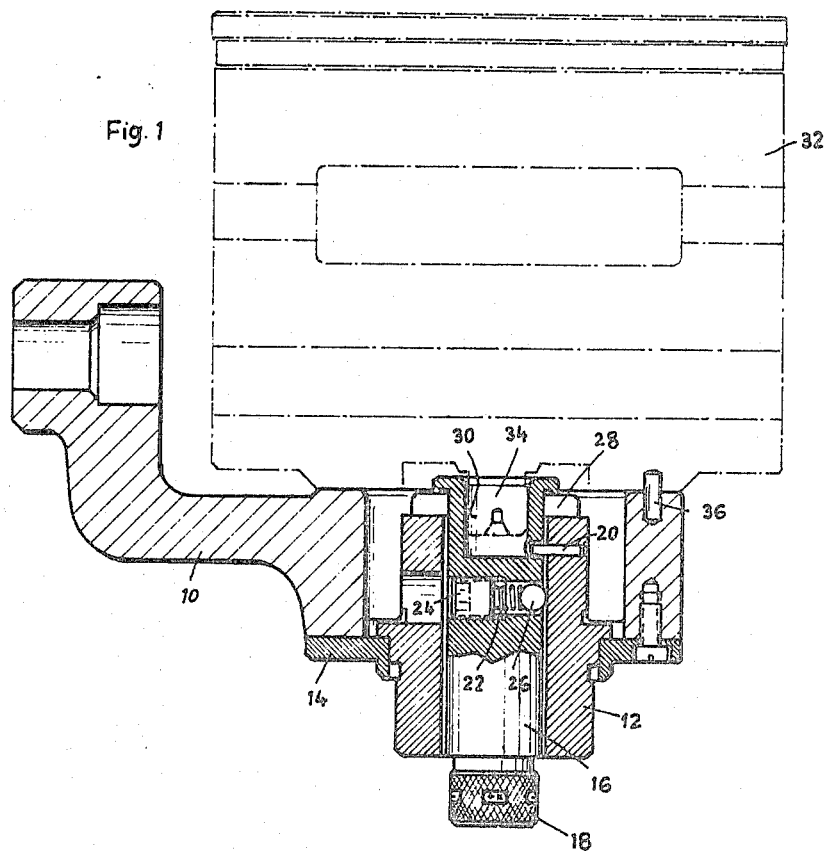
FIG. 1 is a view, mainly in vertical section, of a receiving device for receiving the hydraulic control valve, showing various parts added for purposes of the present invention, and showing the outline of the hydraulic control valve in broken lines.
Figure 2:
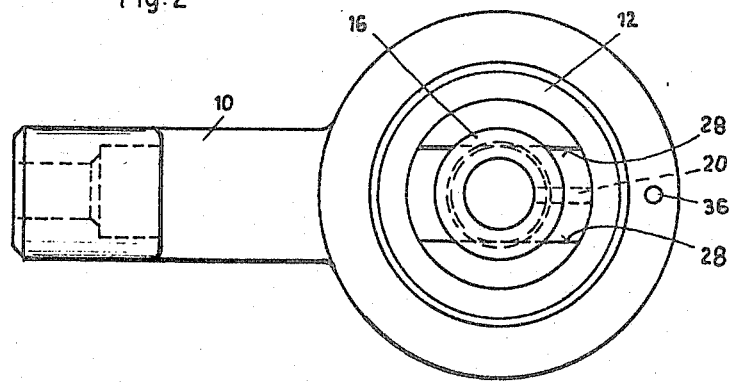
FIG. 2 is a plan of the parts shown in FIG. 1, with the hydraulic control valve removed.

Referring now to FIG. 1 and 2, there is shown at 10 a known conventional bracket or holder adapted to support the hydraulic control valve 32. Mounted in the usual vertical recess of this holder is a bushing 12, held by an annular cover plate 14 which is held by screws to the bottom surface of the bracket 10. The bushing 12 is preferably screw threaded into the plate 14, but sufficiently loosely so that it may be readily turned therein when desired, although held frictionally against accidental turning.

In a vertical bore in the bushing 12 is a pin 16 of slightly smaller diameter than the bore in the bushing, so that the pin has a limited amount of play in a radial direction. A knurled knob 18 at the lower end of the pin 16 may be grasped to turn the pin, and this knurled end may bear suitable indicia such as, for example, $+x$, $-x$, $+y$, and $-y$. The bushing 12 and the pin 16 are connected to each other in such manner that they are non-rotatable with respect to each other, and that the pin may move in only one diametrical direction in the bore in the bushing. This is conveniently accomplished by providing a pin 20 fixed in the bushing and extending snugly but slidably into a radial hole in the pin 16. Thus when the knurled end 18 of the pin is turned, the bushing 12 will turn with it, and the pin 16 can move in the bushing 12 only in the direction of the radial pin 20.

The pin is urged radially in one direction by suitable means such as a spring 22 in a diametrical bore through the pin 16, one end of the spring reacting against a plug 24 and the other end pressing against a ball 26 which, as well seen in FIG. 1, engages one side of the bore in the bushing 12, so that the spring tends to push the pin toward the opposite side of the bore.

For further insurance of correct guiding of the pin 16 in its diametrical movements in the bore of the bushing 12, a portion of the pin 16 near its upper end is formed with parallel flat sides which engage snugly but slidably between flat guide ledges 28 formed on the top of bushing 12. The upper end of the pin 16 is provided with an axial bore 30.

A hydraulic control valve 32 of known form is mounted on the top of the bracket or holder 10, as illustrated in broken lines in FIG. 1, and the control stem of this valve, projecting from the bottom thereof as usual, is seated snugly in the axial bore 30 at the top of the pin 16. The tracing stylus or feeler, which in many cases is mounted on and projects downwardly from the stem 34 of the valve, is removed when the valve is used with the present arrangement. In order to fix the angular position of the valve 32 relative to the supporting arm 10, to be sure that it is properly oriented with respect to the $x$ and $y$ coordinates of the feeding motion, a pin 36 extends into the arm 10 and into the valve 32.

The control valve 32 itself may be of any suitable known form, the details of which are not important for purposes of the present invention. One satisfactory form for such valve is the form shown in the present applicant's copending application, Ser. No. 642,745, filed June 1, 1967. As well understood in the art, movements of the downwardly projecting stem 34 of the valve, in any radial direction from the central rest position, will operate the valve to cause flow of hydraulic fluid so as to operate the hydraulic feed means to cause relative movement between the tool and the work in the corresponding direction. Only an extremely small movement of the stem 34 is sufficient to operate the hydraulic valve, and the slight radial movement of the pin 16 within the bore of the bushing 12 is sufficient for this purpose.

When the usual feeler or stylus is attached to the stem 34 of the control valve, the feeler can move it in any lateral direction, to cause it to operate the hydraulic feed in any desired direction. However, when the valve stem is operated by the pin 16 of the present invention rather than by the normal feeler, it can move only in the one diametrical direction permitted by the pin 20 and the guide flanges 28 which are parallel to the pin 20, movement in other directions being prevented by this construction. By grasping the knurled end 18 and turning it until the desired co-ordinate indication appears in a certain position, the movements of the valve stem can be confined to the desired co-ordinate direction. For example, when the indication $+x$ appears, as shown in FIG. 1, the direction of displacement of the pin 16 (and consequently the direction of displacement of the valve stem 34) by the force of the spring 22 is such as to operate the valve to cause the feed mechanism to move the milling cutter (or the work table, as the case may be) in the $+x$ co-ordinate direction. If the pin 16 is turned 180 degrees from this position, the $-x$ legend will show on the knob 18, and the feeding movement will be in the opposite or $-x$ co-ordinate direction. If turned 90 degrees one way, movement will be along the $+y$ co-ordinate; or if turned 90 degrees the opposite way, then it will be along the $-y$ co-ordinate.

Figure 3:
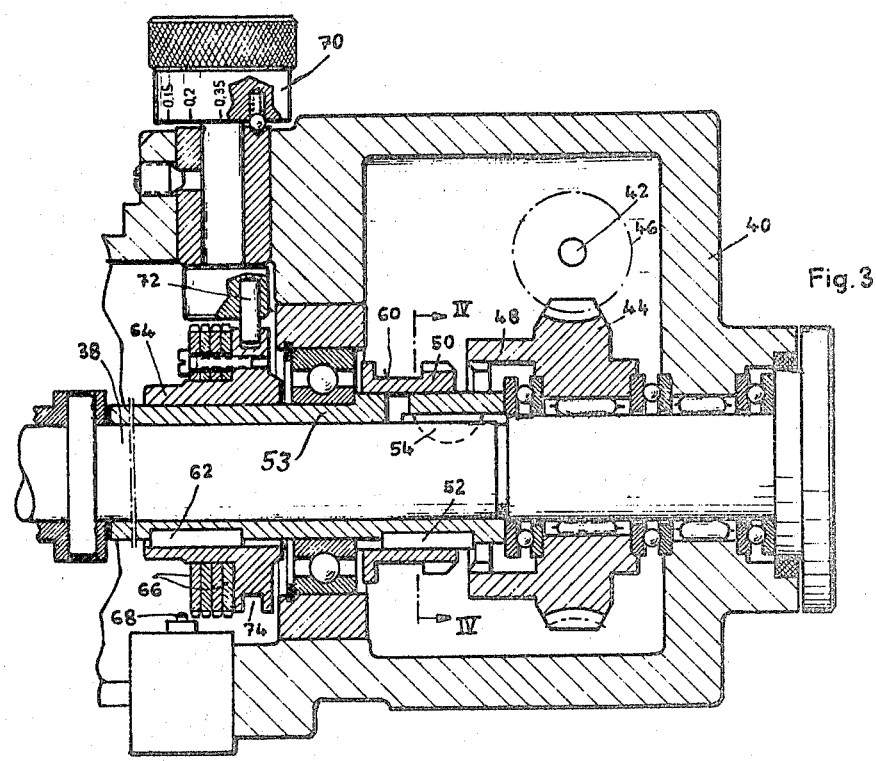
FIG. 3 is an axial section through one end of a screw feed spindle and associated parts.
Figure 4:
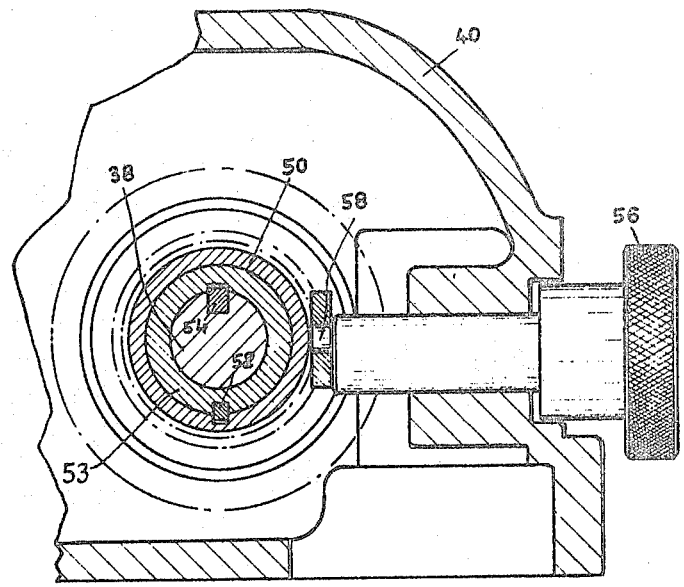
FIG. 4 is a fragmentary cross section approximately on the line IV—IV of FIG. 3.

Referring now to certain parts of the feed mechanism as shown more particularly in FIGS. 3 and 4, the feed mechanism for each of the co-ordinate directions $x$ and $y$ comprises a threaded feed spindle 38, one spindle extending in the $x$ direction and another in the $y$ direction, but only a single spindle is illustrated since the two may be identical. The illustrated end of the spindle 38 is in a drive housing 40 which is fastened to the machine. In the housing is a hydraulic motor controlled by the hydraulic control valve 32, there being, of course, a separate motor for driving each spindle. Only the shaft 42 of the hydraulic motor is indicated in FIG. 3.

A worm 46 fixed to the motor shaft 42 meshes with and drives a worm gear 44 supported rotatably but not axially displaceably on the feed spindle 38. The worm gear 44 has an axial extension 48 which is internally toothed to form one jaw of a separable clutch. These teeth mesh, when the clutch is effective, with external clutch teeth on a sleeve 50 which is splined by a spline 52 so as to be non-rotatably connected to but axially movable on a sleeve 53 which surrounds the feed spindle 38 and is keyed thereto by a key 54 to be fixed both axially and non-rotatably to the spindle 38. An externally accessible knob 56 (see FIG. 4) has an eccentric pin 58, a keeper on which engages in an annular groove 60 on the clutch sleeve 50. By turning the knob 56 to one position, the clutch sleeve 50 is moved to the right when viewed as in FIG. 3, to engage the teeth thereon with the teeth on the worm wheel part 48, thereby clutching the spindle 38 to the worm gear, to turn therewith when the worm gear is driven by its hydraulic motor. Turning the knob 56 to another position moves the clutch part 50 leftwardly to the position shown in FIG. 3, to disengage the clutch.

By means of another spline 62, a collar or sleeve 64 is connected non-rotatably to the sleeve 53 but is axially movable thereon. Fixed on this collar 64, as by means of screws, are a series of switch cams 66 arranged side by side as illustrated. Four such cams are here shown, but a greater or lesser number may be used. By moving the collar 64 axially, any selected one of the switch cams 66 may be brought opposite to the operating plunger of an electric switch 68 which serves, when closed by rotation of the cam, to produce an electric pulse by which the drive motor for this particular feed spindle is stopped. The different cams 66 have switch operating protuberances arranged at different circumferential distances around their peripheries, so that, depending upon which cam is in cooperative relation to the switch, the feed spindle 38 will turn a greater or lesser amount before its driving motor is stopped by operation of the switch.

For the axial displacement of the collar 64, to select the particular cam desired, there is provided an externally accessible rotary knob 70 having an eccentric pin 72 engaging in an annular groove 74 on the collar 64, so that rotation of the knob will move the collar 64 axially to a position where any desired one of the cams 66 is in line with the switch plunger 68, or where all of the cams are out of line with the plunger, as shown in FIG. 3. A spring pressed ball detent, as shown, holds the knob 70 in any particular position to which it has been adjusted. A graduated scale on the knob indicates the size of the line-to-line feed step which will be performed for any particular position of the knob.

It will now be apparent that the mechanism described in connection with FIGS. 3 and 4 is required for each of the two co-ordinate feed directions $x$ and $y$ at right angles to each other; in other words, there are two sets of this feed mechanism illustrated in FIGS. 3 and 4, one for the $x$ co-ordinate and the other for the $y$ co-ordinate of feeding motion. It is pointed out in this connection that this mechanism is very similar to the conventional hydraulic feed mechanism which is normally used for hydraulic feed during the rough milling operaiton, so that very few additional parts, with slight additional expense, are necessary in order to enable the use of the present step-by-step hydraulic feed from one operating line to the next operating line, when one is doing manually controlled milling in a fine or finishing operation. The major difference between this hydraulic feed mechanism of the present invention, and the previously known feed used for rough milling, is in the addition of the clutch 48–50 and its operating knob 56, and the addition of the collar 64 with the switch operating disks or cams 66, and the switch 68, together with the operating knob 70. If it is desired to utilize the present invention for performing hydraulically the step-by-step feeding movement from one milling line to the next, while controlling the movements of the tool along the milling line entirely manually, the clutch 48, 50 of the feed spindle for the co-ordinate direction of the step-by-step feed (that is, across the milling lines) is closed, and the clutch 48, 50 of the other feed spindle which feeds in the co-ordinate direction along the milling lines is open or disengaged.

Figure 5:
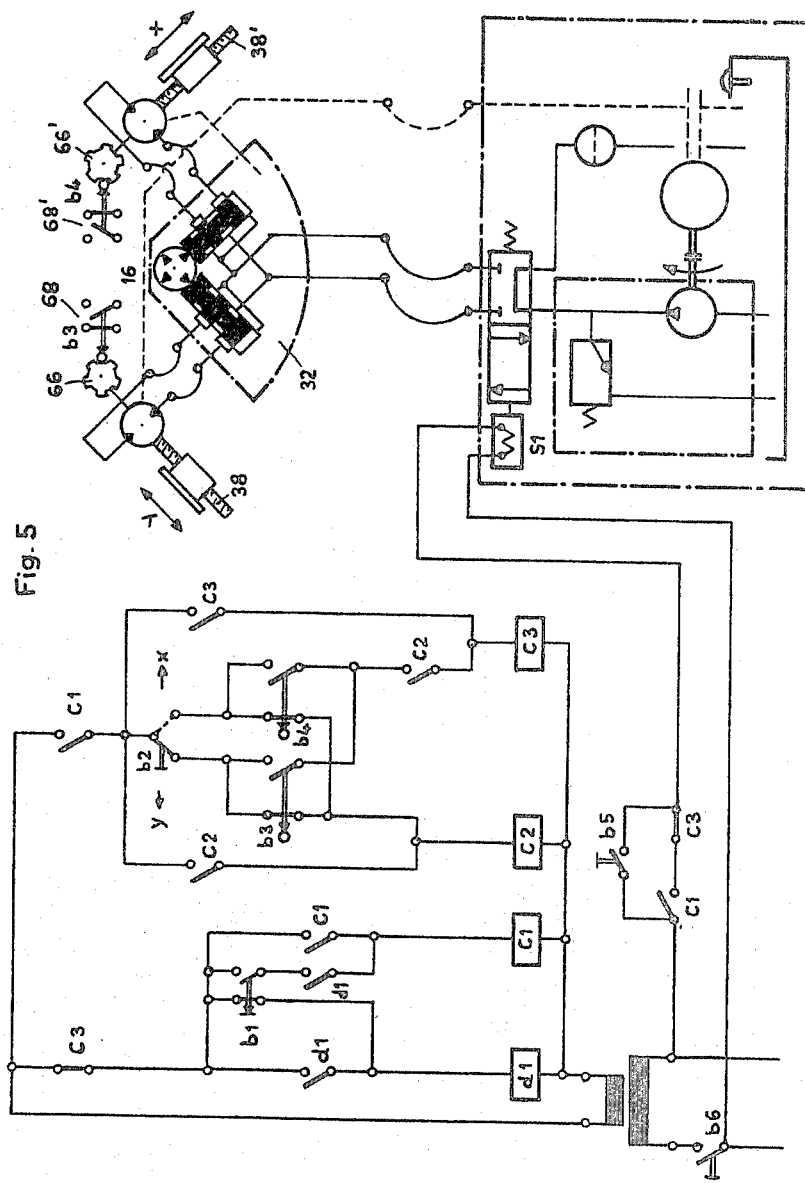
FIG. 5 is a wiring diagram of the electrical control system together with a schematic representation of some of the structural parts.

The electric circuits for controlling the various parts are shown schematically in FIG. 5, which also illustrates schematically some of the mechanical parts. The wiring diagram in FIG. 5 utilizes the customary symbols well understood in this field, so the meaning of the various parts of the diagram will be apparent to those skilled in the art, and no special explanation is necessary. In the upper right portion of FIG. 5, the parts serving for the $y$ co-ordinate have numerals without prime marks, while the numerals with prime marks relate to the parts serving the $x$ co-ordinate.

Those skilled in this art will recognize, of course, that the milling machine is equipped with the usual handle (not shown) which is grasped by the operator and moved manually for manual guiding of the tool. The pushbutton switch which initiates the hydraulic stepping action is preferably mounted on this handle. Thus the machine is capable of rapid and easy use. When the operator has completed the manual traverse of the tool along one milling line, he momentarily pushes the pushbutton switch on the handle, without having to remove his hand from the handle. This will initiate a step feeding action from one milling line to the next milling line, in the desired co-ordinate direction which has been determined by the setting or orientation of the pin 16, and the feeding step will have a length (that is, a distance from one milling line to the next milling line) determined by which particular one of the cams 66 was brought into cooperation with the switch 68 by setting the knob 70. When the protuberance on the selected cam 66 closes the switch 68, this stops the feed which was initiated by closing the pushbutton switch on the handle. This feed from one milling line to the next is usually only a few thousandths of an inch.

Although the operation will be clear to those skilled in this art from a careful study of FIG. 5, a few brief comments may be in order for the benefit of those who are not already familiar with the electro-hydraulic systems of machines of this general character. When the machine is used with hydraulic feed of the tool in all its movements, as for example during rough milling, the switch $b5$ is closed and thus the oil pressure conduit to the hydraulic motors is released by the solenoid valve S1. Now if one desires to shift from complete hydraulic operation to operation in which the tool is manually controlled along the milling line and is hydraulically stepped across from one milling line to the next line, the switch $b5$ is opened and the switch $b6$ is closed. The switch $b2$ is moved to one or the other of its two positions depending upon whether the stepping movement is to take place along the $x$ co-ordinate or the $y$ co-ordinate. The stepping from one line to the next is initiated by closing the pushbutton switch $b1$ which is preferably mounted on the handle, as above mentioned. The solenoid valve S1 is actuated via the relay $c1$ so that the spindle 38 of the desired co-ordinate direction is driven, the cam disk 66 also turning with it until a protuberance on the cam disk engages and closes the switch 68, which is the switch $b3$. In this way, through the relay $c3$, both the solenoid valve S1 and relays $d1$, $c1$, $c2$, and $c3$ are robbed of current. Reconnection by the pushbutton switch $b1$ is only possible after the switch has returned to its position of rest.

It has been mentioned above that in using this hydraulic stepping from one milling line to the next milling line, the tracing stylus or feeler is disconnected from the stem 34 of the control valve 32, in order that the pin 16 may be connected to the stem 34. The spring 22 in the pin 16 keeps the stem 34 displaced constantly in the desired direction for the stepping feed, but the feed does not actually occur until the pushbutton switch on the handle is closed. Only the motor which operates the feed spindle in the desired stepping direction is operative, the other motor being unclutched so that it will not cause any feeding movement even if it is accidentally operated as a result of slight leaks in the control valve. The feeler or tracing stylus removed from the stem 34 of the control valve is, of course, mounted on another suitable part of the milling machine, so that it will travel over the pattern or template while the milling cutter or tool is moved over the work.

It is to be understood that the disclosure is given by way of illustrative example only, rather than by way of limitation, and that without departing from the invention, the details may be varied within the scope of the appended claims.

What is claimed is:

1. A copying milling machine having a milling tool, hydraulic control system means for feeding the milling tool along at least two coordinates at an angle to each other during a power milling operation, said hydraulic control system means including a hydraulic control valve having a movable part normally actuated by a tracer during said power milling operation, means allowing said milling tool to be freely guided manually when said tracer is detached from the hydraulic control valve, the improvement comprising hydraulically operated means for feeding said milling tool a predetermined step in one direction along one of said coordinates from one milling line to another milling line while leaving the milling tool movable manually along the milling line to which it has been fed, said step feeding means being controlled by said hydraulic control system, and said hydraulic control system being regulated by means for actuating the movable part in said control valve.

2. A construction as defined in claim 1, wherein said actuating means includes a biasing member attached to said movable part of said hydraulic movement in said one direction coordinate only.

3. A construction as defined in claim 1, wherein said actuating means includes a spring powered biasing member for attachment to said movable part of said control valve, said biasing member being adjustable to exert biasing force on said movable part of said valve in any one of four line directions 90 degrees apart.

4. A construction as defined in claim 1, wherein said movable part of said hydraulic control valve is a stem projecting downwardly from the bottom of a housing of said valve, said actuating means including a valve supporting bracket having an enlarged opening surrounding said stem, a bushing rotatably mounted in said opening of said bracket and having a bore therein in line with said stem, a pin extending longitudinally in said bore, said pin having an outside diameter less than the inside diameter of said bore so that said pin may move radially in said bore, a tight connection between said pin and said valve stem so that radial movement of said pin in said bore will cause corresponding movement of said stem, means confining radial movement of said pin to a single predetermined diametrical direction in said bore, a spring at least partly within said pin for pressing said pin within said bore along one radius of said diametrical direction, with sufficient force to move said valve stem in the same direction from a central undisplaced position, and an accessible portion manually graspable to turn said bushing and pin together so that the direction in which said pin is pressed by said spring may be adjusted to a desired direction with respect to said valve housing.

5. A construction as defined in claim 1, in which said hydraulic control system includes a hydraulically driven feed spindle, and in which said step feeding means includes an electric switch effective when actuated to stop the step feeding of the tool, and a cam mounted on and turning with said feed spindle for actuating said switch.

6. A construction as defined in claim 5, in which said cam is one of a plurality of cams mounted on and turning with said feed spindle, said cams having different configurations to stop the step feeding of the tool after different extents of movement of the feed spindle, and means or moving any selected one of said cams into cooperative relation to said switch.

7. A construction as defined in claim 6, in which said cams are mounted in side by side relation to each other and are together movable axially along said feed spindle to bring the selected one of said cams into cooperative relation to said switch.

8. A construction as defined in claim 1, in which said hydraulic control system includes a plurality of separate feed spindles, one for feeding the milling tool in each coordinate, a separate hydraulic motor for driving each separate feed spindle, and disengageable clutch means for operatively connecting each hydraulic motor to its own feed spindle, so that when a particular feed spindle is not needed for a particular program of hydraulically operated step feeding, the hydraulic motor for that particular feed spindle may be unclutched from the particular feed spindle to avoid accidental operation of the feed spindle if the motor is accidentally operated.

9. A construction as defined in claim 1, in which said hydraulic control system includes a hydraulically driven feed spindle which serves also as part of said step feeding means, and in which said step feeding means includes a starting electric switch which, when actuated, starts operation of said feed spindle, a stopping electric switch which, when actuated, stops operation of said feed spindle, and movable means operated by movement of said feed spindle for actuating said stopping switch.

10. A construction as defined in claim 9, in which said machine includes a manually actuated handle for guiding said milling tool manually, said starting switch being mounted on said handle.

References Cited

UNITED STATES PATENTS

| | | | |
|---|---|---|---|
| 3,085,477 | 4/1963 | Zwick | 90—13.1 |
| 3,266,375 | 8/1966 | Reeber et al. | 90—13.1 |

FOREIGN PATENTS

| | | |
|---|---|---|
| 1,032,616 | 6/1966 | Great Britain. |

ANDREW R. JUHASZ, Primary Examiner

GIL WEIDENFELD, Assistant Examiner

U.S. Cl. X.R.

90—13.1